US011797198B2

(12) United States Patent
Roberts

(10) Patent No.: US 11,797,198 B2
(45) Date of Patent: Oct. 24, 2023

(54) MEMORY INSTRUCTION FOR MEMORY TIERS

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 46 days.

(21) Appl. No.: 17/238,791

(22) Filed: Apr. 23, 2021

(65) Prior Publication Data

US 2022/0342568 A1 Oct. 27, 2022

(51) Int. Cl.
*G06F 3/06* (2006.01)
*G06F 12/02* (2006.01)

(52) U.S. Cl.
CPC .......... *G06F 3/0631* (2013.01); *G06F 3/0605* (2013.01); *G06F 3/0647* (2013.01); *G06F 3/0653* (2013.01); *G06F 3/0659* (2013.01); *G06F 3/0679* (2013.01); *G06F 12/0238* (2013.01); *G06F 12/0292* (2013.01)

(58) Field of Classification Search
None
See application file for complete search history.

(56) References Cited

U.S. PATENT DOCUMENTS

| | | | |
|---|---|---|---|
| 10,360,155 B1 | 7/2019 | Thomas et al. | |
| 10,552,085 B1 * | 2/2020 | Chen | G06F 3/0647 |
| 10,642,505 B1 * | 5/2020 | Kuzmin | G06F 3/0679 |
| 11,249,652 B1 * | 2/2022 | Kuzmin | G06F 3/0685 |
| 2014/0365719 A1 | 12/2014 | Kuzmin et al. | |
| 2015/0268875 A1 * | 9/2015 | Jeddeloh | G11C 5/025 |
| | | | 711/105 |
| 2017/0123670 A1 | 5/2017 | Jayasena et al. | |
| 2017/0336994 A1 | 11/2017 | Jain et al. | |

FOREIGN PATENT DOCUMENTS

KR 20210019580 A 2/2021
WO WO-2022225603 A1 10/2022

OTHER PUBLICATIONS

Ayers, Grant, "Classifying Memory Access Patterns for Prefetching", ASPLOS'20, Mar. 16-20, 2020, Lausanne, Switzerland, (Mar. 2020), 14 pgs.
Yan, Zi, "Nimble Page Management for Tiered Memory Systems", The Twenty-Fourth International Conference, (2019), 15 pgs.
"International Application Serial No. PCT/US2022/017577, International Search Report dated Jun. 7, 2022", 3 pgs.
"International Application Serial No. PCT/US2022/017577, Written Opinion dated Jun. 7, 2022", 6 pgs.

* cited by examiner

Primary Examiner — Charles Rones
Assistant Examiner — Ryan Dare
(74) Attorney, Agent, or Firm — Schwegman Lundberg & Woessner, P.A.

(57) ABSTRACT

Various embodiments provide for one or more processor instructions and memory instructions that enable a memory sub-system to copy, move, or swap data across (e.g., between) different memory tiers of the memory sub-system, where each of the memory tiers is associated with different memory locations (e.g., different physical memory locations) on one or more memory devices of the memory sub-system.

20 Claims, 7 Drawing Sheets

MEMORY INSTRUCTION FOR MEMORY TIERS

This invention was made with Government support under Subcontract Number 4000165069 awarded by Oak Ridge National Labs. The Government has certain rights in this invention.

TECHNICAL FIELD

Embodiments of the disclosure relate generally to memory devices and, more specifically, to a memory instruction for memory tiers, such as a memory instruction for copying, moving, or swapping data across memory tiers, which can be part of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
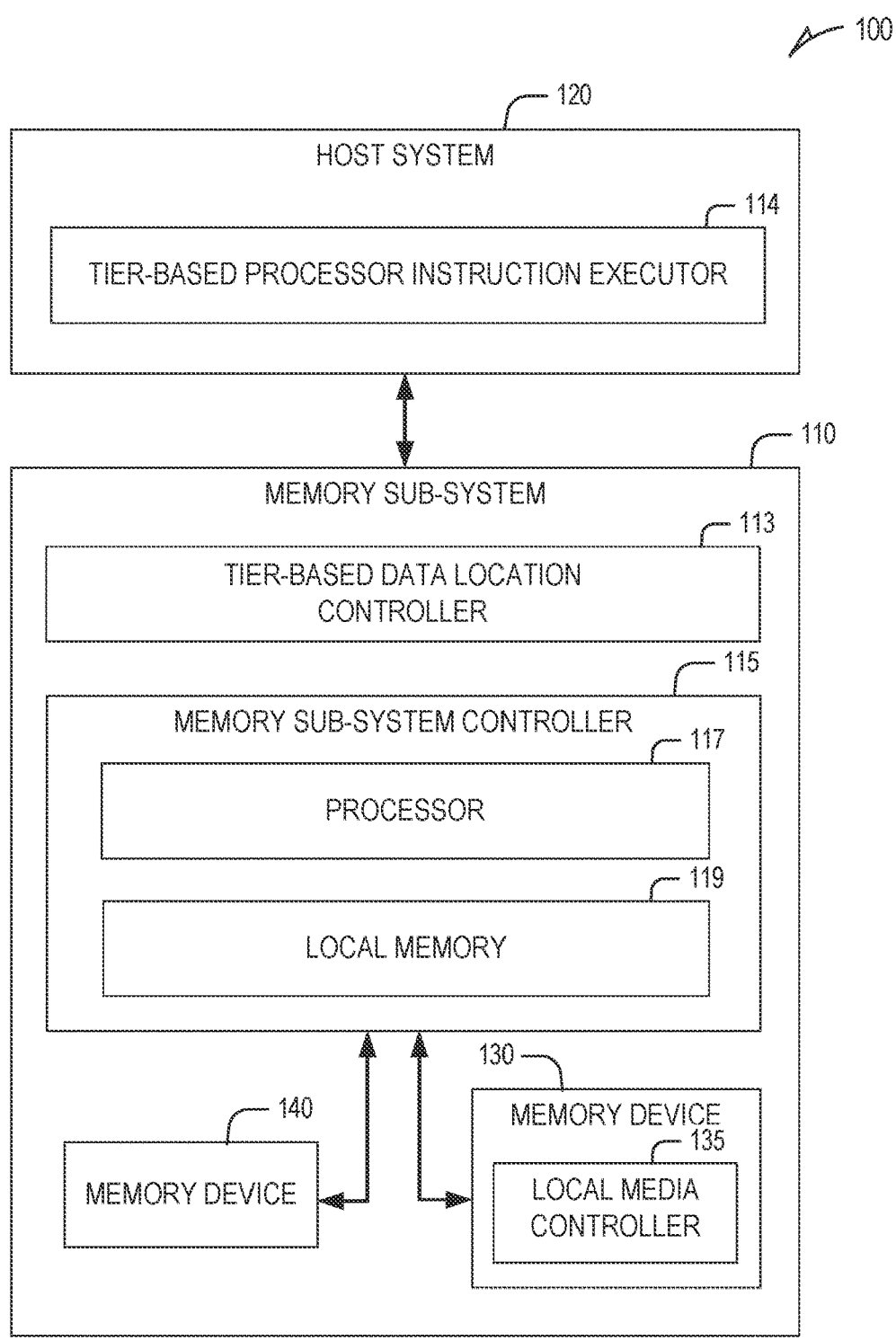
FIG. 1 is a block diagram illustrating an example computing system that includes a memory sub-system, in accordance with some embodiments of the present disclosure.

Aspects of the present disclosure are directed to a memory instruction for memory tiers, which can be part of a memory sub-system. In particular, various embodiments described herein provide for one or more processor instructions and memory instructions that enable a memory sub-system to copy, move, or swap data across (e.g., between) different memory tiers of the memory sub-system, where each of the memory tiers is associated with different memory locations (e.g., different physical memory locations) on one or more memory devices of the memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example, as initiated by the firmware, is hereinafter referred to as "garbage collection data."

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

A tier (or memory tier) of a memory sub-system can refer to a logical memory performance level of the memory sub-system, where two different memory locations or two different memory devices of the memory sub-system can be associated with a different tier. A given tier can be associated, for example, with a speed, a feature, available storage, power usage, or memory type of the memory sub-system. For example, a hybrid memory sub-system can comprise a non-volatile memory (NVM) tier and a dynamic random access memory (DRAM) tier. For conventional systems, operating systems support is generally needed for moving, migrating, or otherwise placing data across (e.g., between) different tiers of a memory sub-system. In particular, conventional technologies rely on an operating system on a host system to determine when and where to move data across memory tiers. For example, data movement/migration/placement across memory tiers often involves a software application invoking the operating system (e.g., via Application Program Interface (API) calls), manipulating page table, using translational lookaside buffers (TLBs), or walking a page table. An existing example of this is non-uniform memory access (NUMA), which when supported by an operating system (e.g., LINUX) permits a software application to use calls to the operating system to specify a preference for allocated memory to reside locally or remotely relative to a central processing unit (CPU).

Various embodiments provide for (e.g., enable) a set of instructions for copying, moving, or swapping data (e.g., blocks of data) across memory tiers of a memory sub-system with little to no involvement of an operating system of a host system. For instance, the set of instructions can enable a software application operating on a host system to request that data be copied, moved, or swapped across memory tiers of the memory sub-system, and make such a request without a call (e.g., API call) to operating system software running on the host system. Use of various embodiments can facilitate movement or migration of data across memory tiers while avoiding the overhead of operating system invocation (e.g., via API calls), page table manipulation, use of translational lookaside buffers (TLBs), or page table walks, which are otherwise needed by conventional technologies to facilitate copying, moving, or swapping data across through support of an operating system of a host system.

For instance, by use of various embodiments described herein, a software application operating on a host system can send a processor instruction to a hardware processor of the host system that causes data to be copied, moved, or swapped across memory tiers without the support of the operating system on the host system (e.g., without need of the software application invoking API calls to the operating system, which can be computationally costly). As a result, a software application can drive hardware-controlled (e.g., memory sub-system-controlled) data movement or migration without needing to invoke the operating system, which in turn can increase performance of the software application. Additionally, use of an embodiment can enable a software compiler to take advantage of a memory sub-system with multiple memory tiers (e.g., a hybrid memory system consisting of multiple DRAM and NVM memory tiers) and manage data movement across memory tiers (e.g., at a much finer and more accurate time schedule with support for variable block sizes) without need for operating system support. For example, an embodiment can enable a software compiler to suggest or require data be moved by a memory sub-system between different memory tiers of the memory sub-system, where the memory tiers can represent different performance or energy levels of the memory sub-system. Such an embodiment can facilitate high performance, compiler-driven data movement across different memory tiers of a memory sub-system without operating system intervention or overhead.

Some embodiments are implemented or otherwise enabled on a memory sub-system via a set of memory instructions that are executable by the memory sub-system, and that a host system can send to the memory sub-system to cause data to be copied, moved, or swapped across memory tiers of the memory sub-system. Additionally, various embodiments are implemented or otherwise enabled on a host system by way of a set of processor instructions (e.g., machine instructions) for copying, moving, or swapping data across memory tiers, where the set of processor instructions is supported by a hardware processor of a host system, and each processor instruction, when executed by the hardware processor, causes the hardware processor to send one or more memory instructions (corresponding to the executed processor instruction) from the host system to the memory sub-system. Depending on the embodiment, the set of processor instructions enabling the copying, moving, or swapping of data across memory tiers augments existing processor instructions (e.g., existing prefetch processor instructions) supported by a hardware processor of the host system.

For a processor instruction (of an embodiment) received by a hardware processor of a host system, the processor instruction can include one or more parameters such as: a source memory address for data to be copied, moved, or swapped; a size value to represent an amount of data to be copied, moved, or swapped with respect to the source memory address; a tier to specify a target memory tier for the data being copied, moved, or swapped; and a target source memory address that is to be used in the copy, move, or swap operation. The source memory address, the target memory address, or both can be a virtual memory address, which can be translated by the hardware processor of the host system into one or more memory addresses (e.g., intermediate memory addresses) used by the memory sub-system with one or more memory instructions (of an embodiment) sent from the host system to the memory sub-system, where the one or more memory addresses received by the memory sub-system can be mapped to one or more memory locations (e.g., physical memory locations) on one or more memory devices of the memory sub-system. Some embodiments implement a processor instruction for copying, moving, or swapping data across memory tiers, using one or more virtual memory addresses, without any changes to virtual memory addresses used by an operating system and without changes to a page table of the operating system.

According to some embodiments, support for the processor instructions and the memory instructions (e.g., memory sub-system instructions) for copying, moving, or swapping data across memory tiers is implemented by way of a control logic (e.g., data location controller or data migration controller) of a memory sub-system, where the control logic can be part of a memory sub-system controller or separate from the memory sub-system controller. For instance, the control logic can be implemented as a logic block located on the memory sub-system, in front of the memory sub-system controller (e.g., after host caches), where the logic block can copy, move, or swap data across memory tiers (e.g., between two memory locations on one or more memory devices of the memory sub-system). The logic block can monitor where (and on which tier) data is physically located on the memory sub-system, and can maintain such information on a mapping table (e.g., mapping table data). Within the mapping table, the logic block can maintain mappings between memory addresses received from a host system (e.g., host-provided memory address) and memory locations, associated with memory tiers, on one or more memory devices of the memory sub-system. The memory address received from the host system can comprise a virtual memory address (which would involve accessing a page table of a host system to translate to a memory-side memory address), or can comprise a translated memory address (which has been translated from a virtual memory address by the host system prior to the host system sending the address to the memory sub-system). Depending on the embodiment, the logic block can facilitate copying, moving, or swapping data across memory tiers with or without use of (e.g., interaction with) the memory sub-system controller. For instance, the logic block can directly interact with one or more memory devices of the memory sub-system to execute a copy, move, or swap of data across memory tiers. Support for implementation and use of an embodiment can be transparent to an operating system of a host system, as a software application on the host system can directly send processor instructions for copying, moving, or swapping data across memory tiers to the hardware processor of the host system without operating system overhead/involvement.

Processor instructions supported by a host system and a memory sub-system can vary between embodiments. For instance, an embodiment can implement one or more of the following processor instructions on a host system: BLOCK_PREFETCH(addr_src, size, tier); BLOCK_SWAP(addr_1, addr_2, size); and SET_TIER(addr_1, size, tier).

BLOCK_PREFETCH(addr_src, size, tier) can represent a processor instruction with parameters addr_src, size, and tier, where the processor instruction causes generation of one or more memory instructions to a memory sub-system to prefetch (e.g., copy) data (e.g., data block), beginning at a source memory address (e.g., source virtual memory address) specified by a add_src parameter and having a size specified (e.g., in number of bytes) by a size parameter, to a target memory tier specified by a tier parameter. Depending on the embodiment, the tier parameter can comprise a 3-bit field that can specify a memory tier between 0-7. In doing so, the processor function can prefetch data from a source memory location, which corresponds to the source memory address and is associated with a current memory tier, to a target memory location, which corresponds to a target memory address and is associated with the target memory tier. The addr_src parameter and the size parameter can give a contiguous range of virtual memory address, which the host (or the memory sub-system) can translate into a list of (intermediate) source memory addresses that the memory sub-system (e.g., data location controller) can map (e.g., using a mapping table) to memory locations on one or more memory devices of the memory sub-system. The (source) memory locations are associated with a current memory tier, and the memory sub-system (e.g., data location controller) can determine a set of available (target) memory locations, associated with the target memory tier, where the data will be prefetched (e.g., copied). As described herein, for some embodiments, the data prefetch (e.g., copy) from the source memory location (and current memory tier) to the target memory tier is performed by a front logic (e.g., data location controller) and may or may not involve use/intervention of the memory sub-system controller. When BLOCK_PREFETCH(addr_src, size, tier) completes execution, it can return to the host system a status regarding the execution (e.g., successful or failed). The BLOCK_PREFETCH (addr_src, size, tier) can be performed, for example, to prefetch data from a first memory tier being used for persistent or long-term data storage, while a second memory tier specified by the tier parameter can be used for caching data.

SET_TIER(addr_1, size, tier) can represent a processor instruction with parameters addr_1, size, and tier, where the processor instruction causes generation of one or more memory instructions to a memory sub-system to set (e.g., move or migrate) data (e.g., data block), beginning at a source memory address (e.g., source virtual memory address) specified by a addr_src parameter and having a size specified by a size parameter, to a target memory tier specified by a tier parameter. In doing so, the processor instruction can change the current memory tier of the data to the target memory tier. When SET_TIER(addr_1, size, tier) completes execution, it can return to the host system a status regarding execution of the execution (e.g., successful or failed).

BLOCK_SWAP(addr_1, addr_2, size) can represent a processor instruction with parameters addr_1, addr_2, and size, where the processor instruction causes generation of one or more memory instructions to a memory sub-system to swap data (e.g., data blocks), between a first memory address (e.g., first virtual memory address) specified by a add_1 parameter and a second memory address (e.g., second virtual memory address) specified by a add_2 parameter, where the amount of data to be swapped is specified (e.g., in number of Bytes) by a size parameter, and where the first memory address and the second memory address are associated with different memory tiers (e.g., memory tier-to-memory tier swap). In doing so, the processor instruction can swap the data between the two memory addresses and swap the data between the two associated memory tiers. When BLOCK_SWAP(addr_1, addr_2, size) completes execution, it can return to the host system a status regarding the execution (e.g., successful or failed).

For some embodiments, a processor instruction described herein includes an additional parameter (e.g., hint parameter), which can indicate whether the processor instruction can be ignored in the event that a memory sub-system cannot perform a memory instruction corresponding to the processor instruction, or whether the processor instruction has to be performed (where the processor instruction is failed or retried until success).

Additionally, an embodiment can implement one or more processor instructions as support for copying, moving, or swapping data across memory tiers. For example, a processor instruction GET_TIER(addr_1) can be used on a host system to obtain from a memory sub-system the current memory tier (e.g., value representing a memory tier) of the memory sub-system being used to store data (e.g., a data block) at a memory location, on the memory sub-system, corresponding to the memory address specified by the addr_1 parameter (e.g., virtual memory address, such as vaddr_block1). Where an embodiment monitors or manages available storage space on a memory sub-system according to memory tiers of the memory sub-system, a processor instruction GET_FREE_SPACE(tier) can be used on a host system to obtain from a memory sub-system the amount of data storage space available on the memory sub-system with respect to the memory tier specified by the tier parameter. Additionally, where an embodiment monitors or manages available storage space on a memory sub-system according to memory tiers of the memory sub-system, a processor instruction GET_MAX_BLOCK_SIZE(tier) can be used on a host system to obtain from a memory sub-system a size (e.g., value in Bytes) for a largest contiguous region (e.g., contiguous block size) of storage space available, on the memory sub-system, for the memory tier specified by the tier parameter.

For each of the support processor instructions (e.g., GET_TIER(addr_1); GET_FREE_SPACE(tier); and GET_MAX_BLOCK_SIZE(tier)), a host system can send a set of corresponding memory instructions to a memory sub-system, and the memory sub-system can respond to the set of corresponding memory instructions by returning information to the host system. For instance, for a memory instruction corresponding to the processor instruction GET_TIER (addr_1), the memory sub-system (e.g., data location controller) can access a mapping table, determine a current memory tier associated a memory-side memory address translated from a memory address (e.g., virtual memory address) specified by the addr_1 parameter, and return to the host system a value representing the current memory tier. For a memory instruction corresponding to the processor instruction GET_FREE_SPACE(tier), the memory sub-system (e.g., data location controller) can access a mapping table (or some other internal data), determine an amount of storage space remaining with respect to the memory tier specified by the tier parameter, and return to the host system a value representing an amount of storage space available on the specified memory tier. For a memory instruction corresponding to the processor instruction GET_MAX_BLOCK_SIZE(tier)), the memory sub-system (e.g., data location controller) can analyze a mapping table (or some other internal data), determine a set of memory-side memory addresses associated with available storage space on the memory tier specified by the tier parameter, determine a largest contiguous range of memory-side memory addresses in the set of memory-side memory addresses, and return to the host system a value representing a starting memory-side memory address for the largest contiguous range of memory-side memory addresses. Additionally, the memory sub-system can return a value representing a size of the largest contiguous range of memory-side memory addresses. The host system can receive the starting memory-side memory address and translate it to a starting virtual memory address (e.g., based on page table). Alternatively, the memory sub-system can translate the starting memory-side memory address to a starting virtual memory address and then return to the host system a value representing the starting virtual memory address.

Though various embodiments are described herein with respect to a data location controller of a memory sub-system that is separate from a memory sub-system controller of the memory sub-system, some embodiments implement features described herein (e.g., operations for copying, moving, or swapping data across different memory tiers) as part of a memory device (e.g., a controller, processor, or state machine of a memory die) or as part of the memory sub-system controller itself.

As used herein, a virtual memory address can comprise an abstracted memory address used on a host system that maps to one or more memory-side memory addresses (e.g., physical or actual memory addresses) of a memory sub-system, where the one or more memory-side memory addresses correspond to one or more memory locations on one or more memory devices of the memory sub-system.

As used herein, a tier (or memory tier) of a memory sub-system can refer to a logical memory performance level of the memory sub-system, where two different memory locations (e.g., physical memory locations) or two different memory devices of the memory sub-system can be associated with a different tier. A given tier can be associated, for example, with a speed, a feature, available storage, power usage, or memory type of the memory sub-system. For instance, a first memory tier can be associated with one or more memory devices of the memory sub-system that are of a first memory type, such as NVRAM, while a second memory tier can be associated with one or more memory devices of the memory sub-system that are of a second memory type, such as DRAM. In another instance, a first memory tier can be associated with one or more memory storage locations, storage regions, or memory addresses of the memory sub-system that are used for a first purpose, such as caching, temporary, or non-persistent storage, while a second memory tier can be associated with one or more memory storage locations, storage regions, or memory addresses that are used for a second purpose, such as persistent or long-term storage. In another instance, a first memory tier can be associated with one or more memory devices that provide faster data speed or operate at higher power consumption, while a second memory tier can be associated with one or more memory devices that provide slower data speed or operate at lower power consumption. In another instance, a single memory device of the memory sub-system can comprise two different memory locations that are each associated with different memory tiers. During operation of the memory sub-system, a memory controller can store data on different memory tiers for different purposes.

Disclosed herein are some examples of copying or moving data across (e.g., between) different memory tiers, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance). Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface. Fibre Channel. Serial Attached SCSI (SAS). Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI).

Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLCs), can store one bit per cell. Other types of memory cells, such as multi-level cells (MLCs). TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive instructions, commands or operations from the host system 120 and can convert the instructions, commands, or operations into appropriate instructions or commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

As shown, the memory sub-system 110 includes a (memory) tier-based data location controller 113 to implement an embodiment described herein with respect to the memory sub-system 110, and the host system 120 includes a (memory) tier-based processor instruction executor 114 to implement an embodiment described herein with respect to the host system 120. For instance, the tier-based data location controller 113 can enable the memory sub-system 110 to process or execute a memory instruction on data with respect to different memory tiers of the memory sub-system 110 as described herein, while the tier-based processor instruction executor 114 can enable the host system 120 to process or execute a memory command that causes the host system 120 to send to the memory sub-system 110 one or more memory instructions for data with respect to different memory tiers as described herein. For some embodiments, at least a portion (if not all) of the tier-based processor instruction executor 114 can be implemented as part of a hardware processor of the host system 120. Depending on the embodiment, the combination of the tier-based processor instruction executor 114 (implementing support for the one or more of the following processor instructions on the host system 120) and the tier-based data location controller 113 (implementing support for corresponding memory instructions on the memory sub-system 110) can facilitate execution of one or more of the following processor instructions: BLOCK_PREFETCH(addr_src, size, tier); BLOCK_SWAP(addr_1, addr_2, size); SET_TIER(addr_1, size, tier); GET_TIER (addr_1); GET_FREE_SPACE(tier); and GET_MAX_BLOCK_SIZE(tier). Depending on the embodiment, a mapping table accessed and maintained by the tier-based data location controller 113 can form a part of the tier-based data location controller 113 or be separate from the tier-based data location controller 113 (e.g., stored on memory that is external to the tier-based data location controller 113 but part of the memory sub-system 110).

FIGS. 2 through 5 are flow diagrams of example methods for memory tiers, in accordance with some embodiments of the present disclosure. The methods 200, 300, 400, 500 can be performed by processing logic that can include hardware (e.g., processing device, circuitry, dedicated logic, programmable logic, micro-code, hardware of a device, integrated circuit, etc.), software (e.g., instructions run or executed on a processing device), or a combination thereof. In some embodiments, at least one of the methods 200, 300, 400 is performed by the memory sub-system 110 of FIG. 1 based on the tier-based data location controller 113. Additionally, or alternatively, for some embodiments, at least one of the methods 200, 300, 400 is performed, at least in part, by the local media controller 135 of the memory device 130 of FIG. 1. For some embodiments, at least method 500 is performed by the host system 120 based on the tier-based processor instruction executor 114. The illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 2:
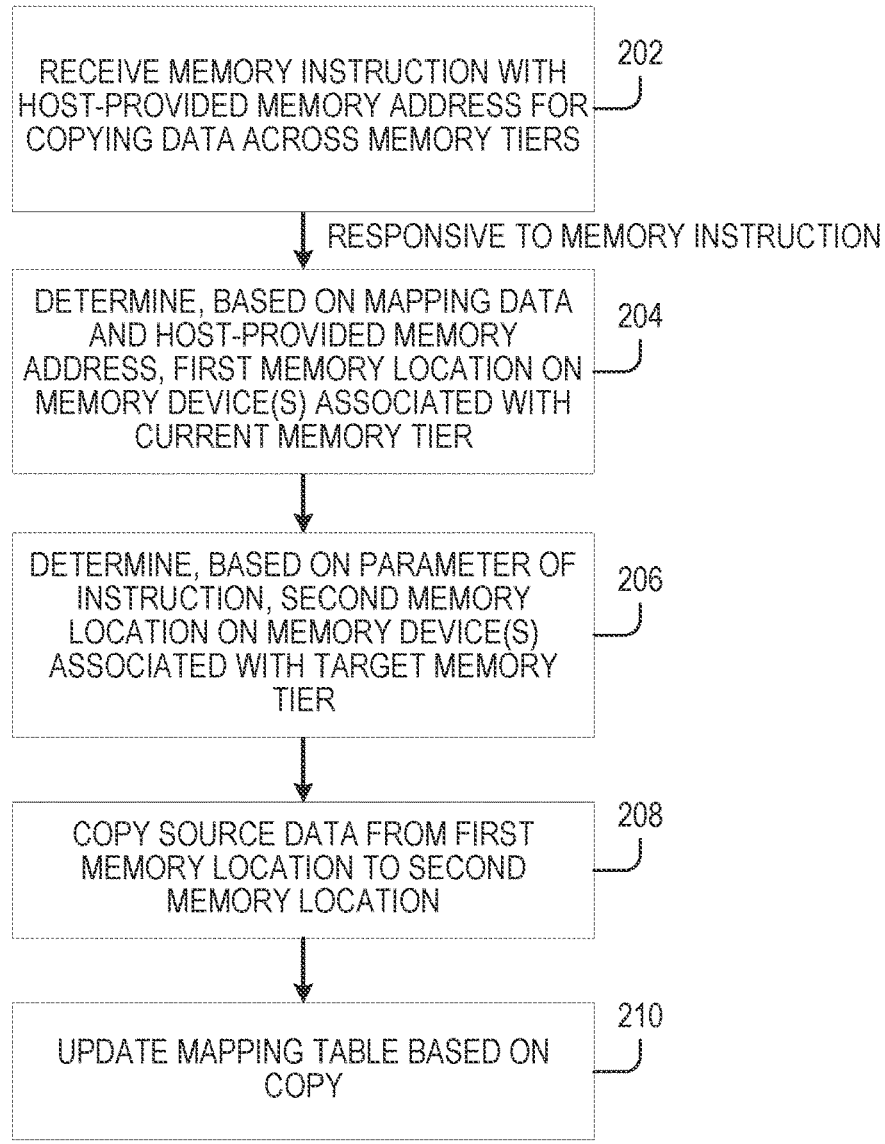
FIGS. 2 through 5 are flow diagrams of example methods for memory tiers, in accordance with some embodiments of the present disclosure.

Referring now to the method 200 of FIG. 2, the method 200 illustrates an example of copying data across memory tiers of a memory sub-system (e.g., 110), in accordance with some embodiments. The method 200 can be performed by a memory sub-system (e.g., 110) in response to a processor instruction, executed by a hardware processor of the host system 120, for prefetching data from one memory tier to another memory tier of a memory sub-system, such as BLOCK_PREFETCH(addr_src, size, tier), as described herein. For some embodiments, the method 200 is performed by the tier-based data location controller 113 of the memory sub-system 110.

At operation 202, a tier-based data location controller (e.g., the tier-based data location controller 113 of the memory sub-system controller 115) receives from a host system (e.g., 120) a memory instruction, with a host-provided memory address, for copying data across memory tiers of a memory sub-system (e.g., 110). For various embodiments, the memory instruction comprises a parameter that specifies a target memory tier of the memory sub-system (e.g., 110). According to some embodiments, the host-provided memory address (e.g., virtual memory address or translated memory address) maps to a current memory location (e.g., physical memory location) on a memory device (e.g., 130, 140) of the memory sub-system (e.g., 110), the current memory location is associated with a current memory tier (that is different from the target memory tier), and the received memory instruction is intended to cause data from the current memory location to be copied to another memory location that is associated with the (specified) target memory tier. As described herein, the memory instruction received at operation 202 can be part of a plurality of memory instructions received from the host system (e.g., 120), where the plurality of memory instructions is generated and sent by the host system in response to a processor instruction (for copying data across memory tiers) received by the hardware processor of the host system. The host-provided memory address can comprise a memory-side memory address (e.g., physical memory address) that was translated by the host system from a virtual memory address provided with the processor instruction (e.g., by a software application on the host system), or the host-provided memory address can comprise a virtual memory address that the memory sub-system (e.g., the tier-based data location controller 113) will need to translate prior to mapping to a current memory location on the memory sub-system.

Where the host-provided memory address comprises a virtual memory address, the tier-based data location controller (e.g., 113) can translate the host-side virtual memory address to a memory-side memory address. The tier-based data location controller can request (e.g., via the PCIe bus between the memory sub-system and the host system) that the host system (e.g., 120) translate the host-provided virtual memory address to a corresponding memory-side memory address (which represents the translated memory address). Based on the mapping table and the corresponding memory-side memory address (e.g., mapping of the corresponding memory-side memory address to the first memory location), the tier-based data location controller (e.g., 113) can determine the first memory location on the set of memory devices (e.g., 130, 140).

In response to the memory instruction received at operation 202, at operation 204, the tier-based data location controller (e.g., 113) determines (e.g., identifies) a first memory location on a set of memory devices (e.g., 130, 140) of the memory sub-system (e.g., 120), where the first memory location is associated with a current memory tier of the memory sub-system, and the first memory location is storing source data to be copied to the (specified) target memory tier. For some embodiments, the tier-based data location controller determines the first memory location based on the mapping table and the host-provided memory address received at operation 202. According to some embodiments, the mapping table is maintained by the tier-based data location controller 113, and the mapping table stores information (e.g., mapping data) that describes a mapping between the host-provided memory address and the first memory location.

At operation 206, the tier-based data location controller (e.g., 113) determines a second memory location on the set of memory devices based on the parameter, where the second memory location is associated with the target memory tier specified by the parameter. Depending on the embodiments, the first memory location and the second memory location are on a single memory device (e.g., 130) of the set of memory devices (e.g., 130, 140), but the first and second memory locations are associated with different memory tiers. Alternatively, the first memory location can be on a first memory device (e.g., 130) of the set of memory devices, and the second memory location can be on a second memory device (e.g., 140) of the set of memory devices, where the first memory location or the first memory device can be associated with the first memory tier, and the second memory location or the second memory device can be associated with the second memory tier. For some embodiments, the tier-based data location controller (e.g., 113) is configured to monitor available storage on the set of memory devices (e.g., 130, 140), and can do so according to memory tiers of the memory sub-system (e.g., 110). In determining the second memory location on the set of memory devices based on the parameter, the tier-based data location controller (e.g., 113) can determine whether the target memory tier has sufficient storage for the source data. In response to determining that the target memory tier has sufficient storage for the source data, the tier-based data location controller (e.g., 113) can determine the second memory location from a set of available memory locations (on the set of memory devices) that are associated with the target memory tier. Where the target memory tier lacks sufficient data storage space, the tier-based data location controller (e.g., 113) can inform the host system (e.g., 120) of the issue or indicate failure.

Thereafter, at operation 208, the tier-based data location controller (e.g., 113) copies (or causes the copying of) the source data (e.g., one or more data blocks) from the first memory location to the second memory location, where the first memory location is determined at operation 204 and the second memory location is determined at operation 206. Depending on the embodiment, the tier-based data location controller may or may not use the memory sub-system controller (e.g., 115) to facilitate this copy operation.

Based on the copying of the source data at operation 208, at operation 210, the tier-based data location controller (e.g., 113) updates, in the mapping table (previously used at operation 204), a mapping of the second memory location. For some embodiments, the mapping table is updated to indicate that the second memory location now stores a copy of the source data. Because the tier-based data location controller performs a copy (and not a move) at operation 208, the mapping table can continue to map the host-provided memory address (or where the host-provided memory address is a virtual memory address, a translated memory-side memory address thereof) to the first memory location.

Figure 3:
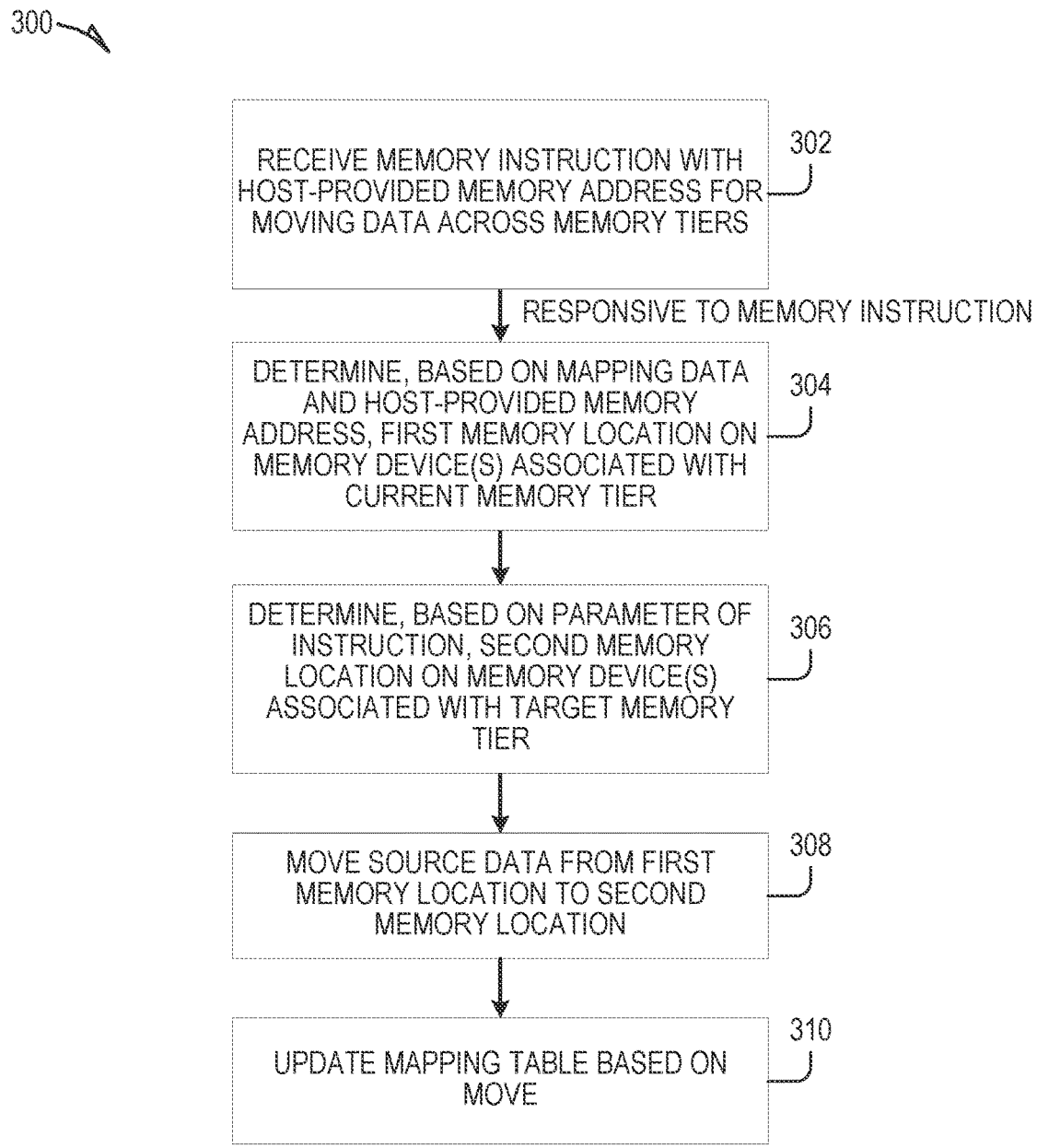

Referring now to the method 300 of FIG. 3, the method 300 illustrates an example of moving data across memory tiers of a memory sub-system, in accordance with some embodiments. The method 300 can be performed in response to a processor instruction, executed by a hardware processor of the host system 120, for setting a memory tier of data stored on a memory sub-system, such as SET_TIER (addr_1, size, tier) as described herein. For some embodiments, the method 300 is performed by the tier-based data location controller 113 of the memory sub-system 110.

At operation 302, a tier-based data location controller (e.g., the tier-based data location controller 113 of the memory sub-system controller 115) receives from a host system (e.g., 120) a memory instruction, with a host-provided memory address, for moving data across memory tiers of a memory sub-system (e.g., 110). For various embodiments, the memory instruction comprises a parameter that specifies a target memory tier of the memory sub-system (e.g., 110). According to some embodiments, the host-provided memory address (e.g., virtual memory address or translated memory address) maps to a current memory location (e.g., physical memory location) on a memory device (e.g., 130, 140) of the memory sub-system (e.g., 110), the current memory location is associated with a current memory tier (that is different from the target memory tier), and the received memory instruction is intended to cause data from the current memory location to be moved to another memory location that is associated with the (specified) target memory tier. As described herein, the memory instruction received at operation 302 can be part of a plurality of memory instructions received from the host system (e.g., 120), where the plurality of memory instructions is generated and sent by the host system in response to a processor instruction (for moving data across memory tiers) received by the hardware processor of the host system. The host-provided memory address can comprise a memory-side memory address (e.g., physical memory address) that was translated by the host system from a virtual memory address provided with the processor instruction (e.g., by a software application on the host system), or the host-provided memory address can comprise a virtual memory address that the memory sub-system (e.g., the tier-based data location controller 113) will need to translate prior to mapping to a current memory location on the memory sub-system.

In response to the memory instruction received at operation 302, the tier-based data location controller (e.g., 113) performs operations 304 through 310. For some embodiments, operations 304 and 306 are respectively similar to operations 204 and 206 of the method 200 of FIG. 2. At operation 308, the tier-based data location controller (e.g., 113) moves (or causes the movement of) the source data (e.g., one or more data blocks) from the first memory location to the second memory location, where the first memory location is determined at operation 304 and the second memory location is determined at operation 306. Depending on the embodiment, the tier-based data location controller may or may not use the memory sub-system controller (e.g., 115) to facilitate this copy operation.

Based on the movement of the source data at operation 308, at operation 310, the tier-based data location controller (e.g., 113) updates, in the mapping table (previously used at operation 304), a mapping of the second memory location.

For some embodiments, the mapping table is updated to map the host-provided memory address (or where the host-provided memory address is a virtual memory address, a translated memory-side memory address thereof) to the second memory location that now stores the source data. Additionally, the mapping table can be updated at operation 310 to indicate that the first memory location is no longer storing the source data or no longer storing valid data.

Figure 4:
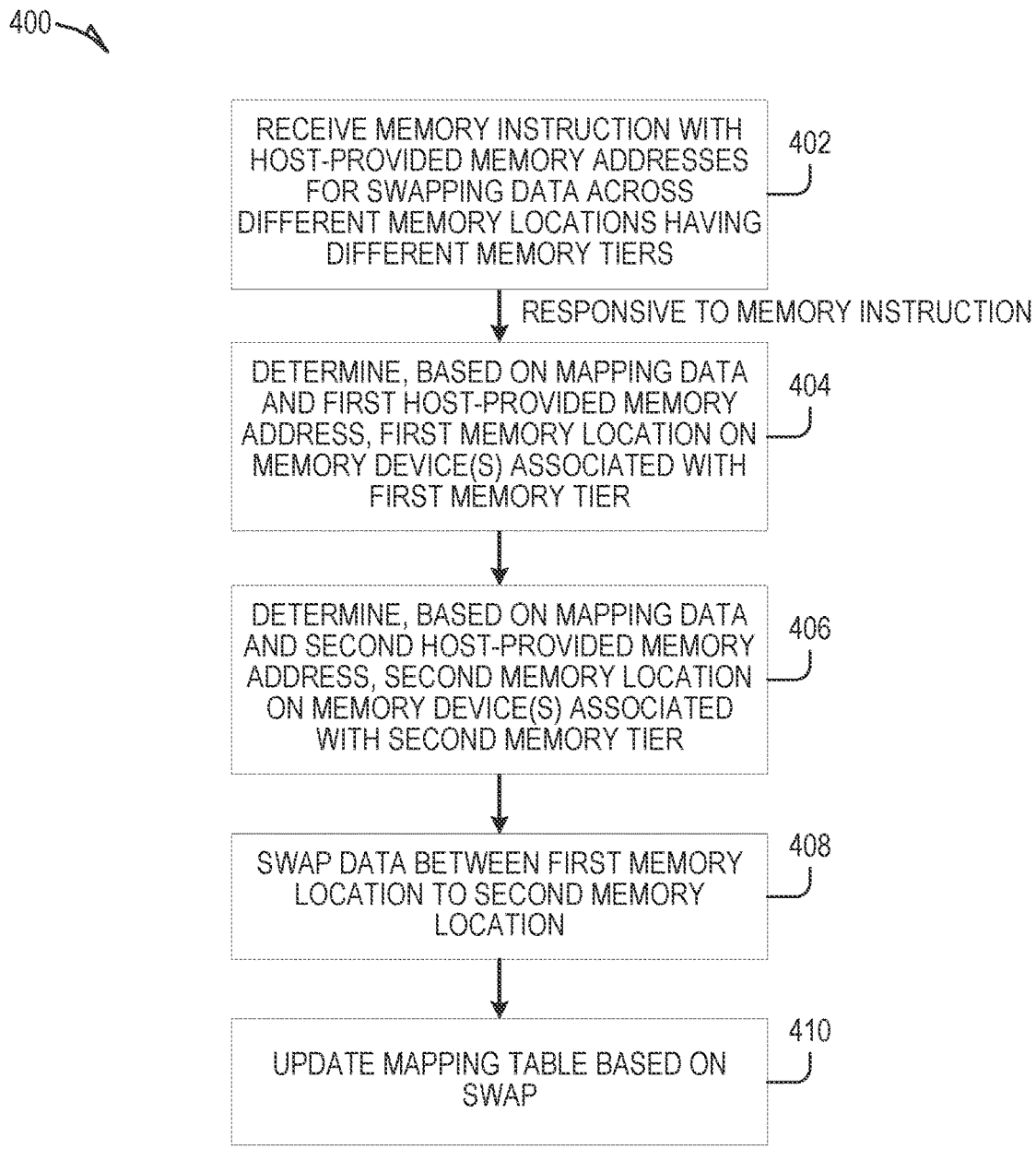

Referring now to the method 400 of FIG. 4, the method 400 illustrates an example of swapping data across memory tiers of a memory sub-system, in accordance with some embodiments. The method 400 can be performed in response to a processor instruction, executed by a hardware processor of the host system 120, for swapping data between memory tiers on a memory sub-system, such as BLOCK_SWAP(addr_1, addr_2, size), as described herein. For some embodiments, the method 400 is performed by the tier-based data location controller 113 of the memory sub-system 110.

At operation 402, a tier-based data location controller (e.g., the tier-based data location controller 113 of the memory sub-system controller 115) receives from a host system (e.g., 120) a memory instruction, with host-provided memory addresses, for swapping data across memory tiers of a memory sub-system (e.g., 110). For various embodiments, the host-provided memory addresses comprise a first host-provided memory address and a second host-provided memory address, where the first host-provided memory address is associated with a first memory tier of the memory sub-system, and the second host-provided memory address is associated with a second memory tier of the memory sub-system. According to some embodiments, the first host-provided memory address (e.g., first virtual memory address or first translated memory address) maps to a first memory location (e.g., physical memory location) on a memory device (e.g., 130, 140) of the memory sub-system (e.g., 110), and the second host-provided memory address (e.g., second virtual memory address or second translated memory address) maps to a second memory location (e.g., physical memory location) on a memory device (e.g., 130, 140) of the memory sub-system (e.g., 110). As described herein, the memory instruction received at operation 402 can be part of a plurality of memory instructions received from the host system (e.g., 120), where the plurality of memory instructions is generated and sent by the host system in response to a processor instruction (for swapping data across memory tiers) received by the hardware processor of the host system. The first and second host-provided memory addresses can comprise first and second memory-side memory addresses (e.g., first and second physical memory addresses) that were translated by the host system from first and second virtual memory addresses provided with the processor instruction (e.g., by a software application on the host system), or the first and second host-provided memory addresses can comprise first and second virtual memory addresses that the memory sub-system (e.g., the tier-based data location controller 113) will need to translate prior to mapping to the first and second memory locations on the memory sub-system.

In response to the memory instruction received at operation 402, at operation 404, the tier-based data location controller (e.g., 113) determines (e.g., identifies) a first memory location on a set of memory devices (e.g., 130, 140) of the memory sub-system (e.g., 120) based on the mapping table and the first host-provided memory address and, at operation 406, the tier-based data location controller (e.g., 113) determines (e.g., identifies) a second memory location on a set of memory devices (e.g., 130, 140) of the memory sub-system (e.g., 120) based on the mapping table and the second host-provided memory address. In particular, in the mapping table, the first host-provided memory address (or where the first host-provided memory address is a first virtual memory address, a first translated memory-side memory address thereof) can map to the first memory location, and the second host-provided memory address (or where the second host-provided memory address is a second virtual memory address, a second translated memory-side memory address thereof) can map to the second memory location. For some embodiments, the first memory location is associated with a first memory tier of the memory sub-system, and the second memory location is associated with a second memory tier of the memory sub-system.

Thereafter, at operation 408, the tier-based data location controller (e.g., 113) swaps (or causes the swap of) data (e.g., one or more data blocks) between the first memory location and the second memory location, where the first memory location is determined at operation 404 and the second memory location is determined at operation 406. For some embodiments, the first memory location stores a first data, and the second memory location stores second data, where operation 408 comprises the tier-based data location controller (e.g., 113) moving the first data from the first memory location and the second memory location and moving the second data from the second memory location and the first memory location. Depending on the embodiment, the tier-based data location controller (e.g., 113) can use a memory region to temporarily store the first data or the second data to facilitate the swap of data, where the memory region may or may not be part of the tier-based data location controller (e.g., 113).

Based on the swapping of data at operation 408, at operation 410, the tier-based data location controller (e.g., 113) updates, in the mapping table (previously used at operation 404), a mapping of the first memory location and a mapping of the second memory location. For some embodiments, the mapping table is updated to map the first host-provided memory address (or where the first host-provided memory address is a first virtual memory address, a first translated memory-side memory address thereof) to the second memory location that now stores the first data, and to map the second host-provided memory address (or where the second host-provided memory address is a second virtual memory address, a second translated memory-side memory address thereof) to the first memory location that now stores the second data.

Figure 5:
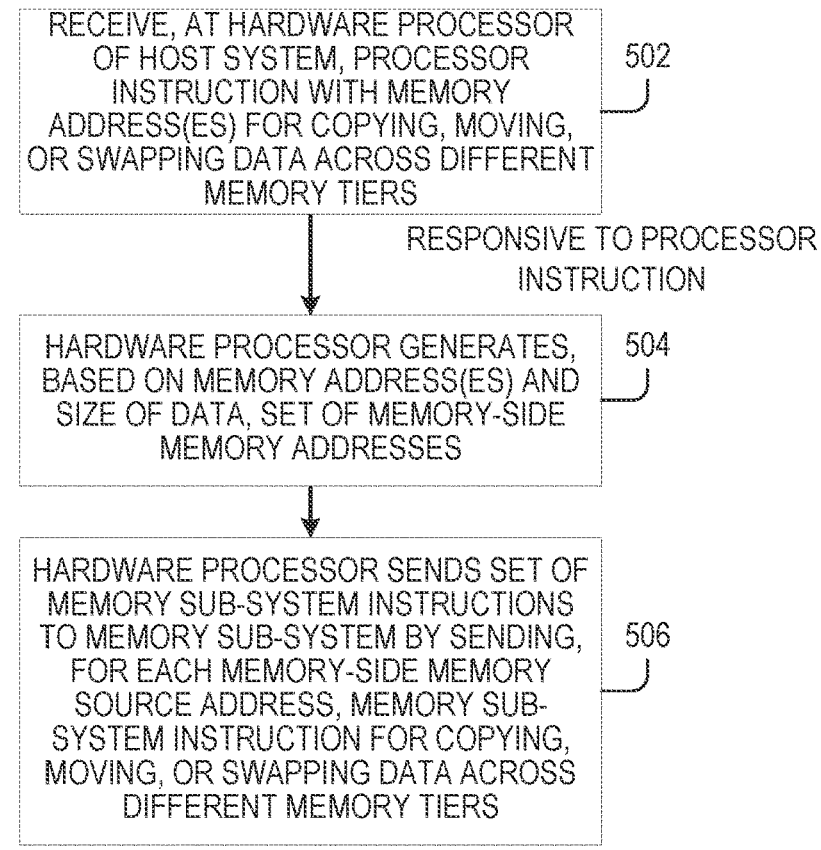

Referring now to the method 500 of FIG. 5, the method 500 illustrates an example of executing on a host system a processor instruction for copying, moving, or swapping data across memory tiers, in accordance with some embodiments. The method 500 can be performed in response to a processor instruction for copying, moving, or swapping data across memory tiers, generated by a software application on a host system 120 and received by a hardware processor of the host system 120. The processor instruction can include, for example, BLOCK_PREFETCH(addr_src, size, tier), BLOCK_SWAP(addr_1, addr_2, size), and SET_TIER (addr_1, size, tier), as described herein. For some embodiments, the method 500 is performed by the tier-based processor instruction executor 114 of the memory sub-system 110.

At operation 502, a tier-based memory instruction executor (e.g., the tier-based processor instruction executor 114 of the host system 120) causes a hardware processor of the host system (e.g., 120) to receive (e.g., from a software application operating on the host system 120) a processor instruction, with one or more memory addresses, for copying, moving, or swapping data across memory tiers of a memory sub-system (e.g., 110) operably coupled to the host system (e.g., 120). The number of memory addresses included with the processor instruction can depend on the processor instruction, and the number and types of parameters included with the processor instruction can depend on the processor instruction. For example, for a processor instruction for copying or moving data across memory tiers, the processor instruction can include a source memory address, a target memory address or a parameter specifying a target memory tier, and a parameter specifying a size or amount of data to be copied/moved. For a processor instruction for swapping data across memory tiers, the processor instruction can include a first memory address, a second address, and a parameter specifying a size or amount of data to be swapped. For various embodiments, each of the one or more memory addresses received with the processor instruction is a virtual memory address, which will eventually be translated to a memory-side memory address (e.g., physical memory address) for execution of the copy/move/swap of data across memory tiers.

For some embodiments, the hardware processor translates the one or more memory addresses to one or more memory-side memory addresses prior to sending, to the memory sub-system (e.g., 110), one or more memory instructions corresponding to the processor instruction. Accordingly, in response to receiving the processor instruction at operation 502, the tier-based memory instruction executor (e.g., 114) causes the hardware processor to generate a set of memory-side memory addresses based on the one or more addresses received at operation 502. In this way, the set of memory-side memory addresses can represent translated or physical memory addresses used by the memory sub-system (e.g., 110). For instance, for a processor instruction for copying or moving data across memory tiers that includes a source memory address and a size of data parameter, the hardware processor can determine a set of source memory-side memory addresses (e.g., a range of physical memory addresses) by translating the source memory address to a start memory-side memory address and, based on the size of data parameter, determine the range of memory-side memory addresses starting from the start memory-side memory address. In another instance, for a processor instruction for copying or moving data across memory tiers that includes a first memory address, a second memory address, and a size of data parameter, the hardware processor can determine a first set of memory-side memory addresses (e.g., a first range of physical memory addresses) and a second set of memory-side memory addresses (e.g., a second range of physical memory addresses) by: translating the first source memory address to a first start memory-side memory address; translating the second source memory address to a second start memory-side memory address; and based on the size of data parameter, determining the first range of memory-side memory addresses starting from the first start memory-side memory address and the second range of memory-side memory addresses starting from the second start memory-side memory address.

At operation 506, the tier-based memory instruction executor (e.g., 114) causes the hardware processor to send a set of memory sub-system instructions (corresponding to the processor instruction received at operation 502) to the memory sub-system (e.g., 110). For some embodiments, operation 506 is performed by the hardware processor sending, for each memory-side source address in the set of memory-side memory addresses (generated at operation 504), a memory sub-system instruction for copying, moving, or swapping data across different memory tiers based on the memory-side source address.

Figure 6:
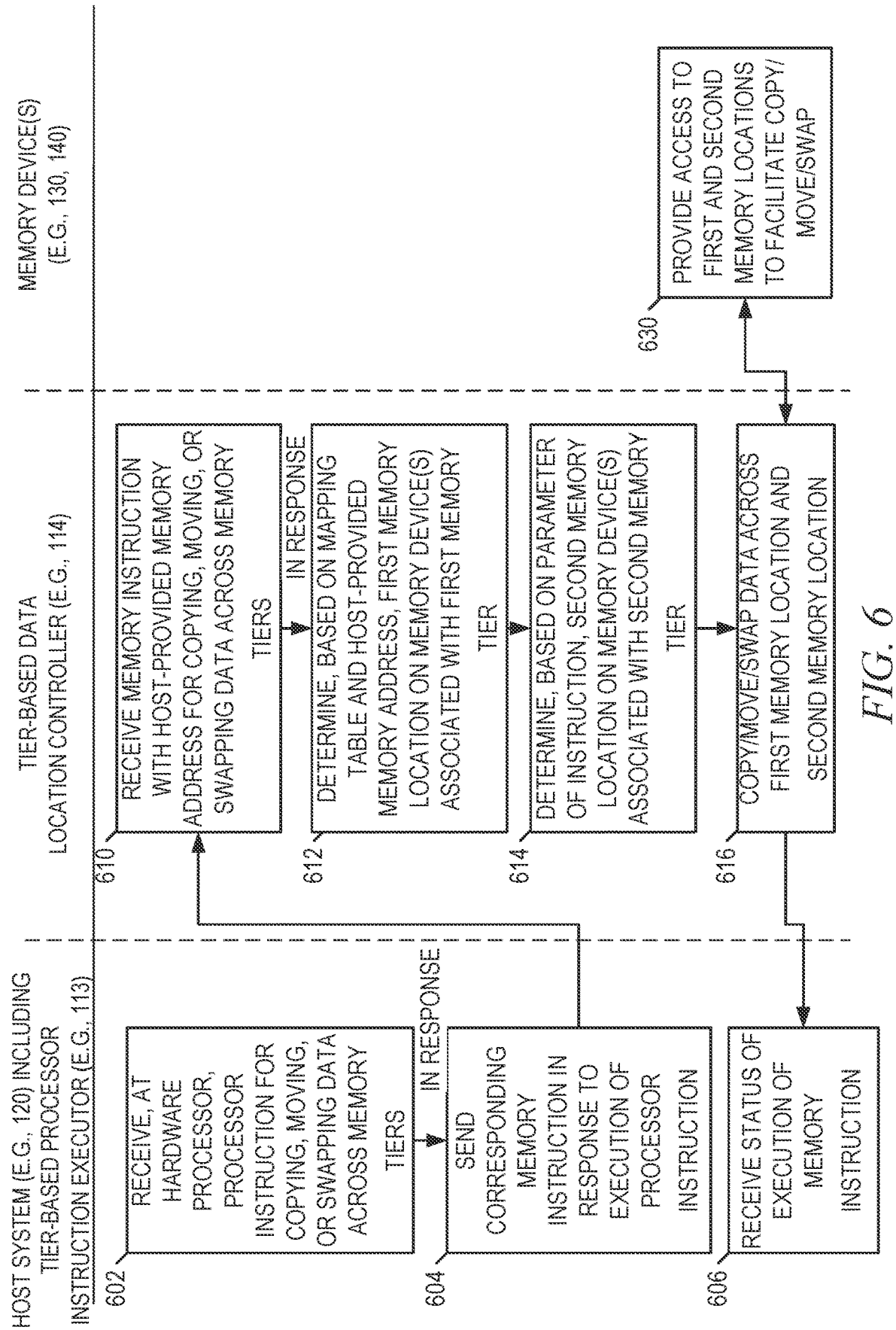
FIG. 6 provides an interaction diagram illustrating interactions between components of a computing environment in the context of some embodiments in which a method that copies, moves, or swaps data across memory tiers as described herein is performed.

FIG. 6 provides an interaction diagram illustrating interactions between components of a computing environment in the context of some embodiments in which a method that copies, moves, or swaps data across memory tiers as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120) that includes a tier-based processor instruction executor (e.g., 114), a tier-based data location controller (e.g., 113), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 6, the host system can include the host system 120, a tier-based processor instruction executor can include the tier-based processor instruction executor 114, the tier-based data location controller can include the tier-based data location controller 113, the memory sub-system controller can include the memory sub-system controller 115, and the memory device can include the memory devices 130, 140.

As shown in FIG. 6, at operation 602, a hardware processor of the host system 120 sends a processor instruction (e.g., from a software application operating on the host system 120) for copying, moving, or swapping data across memory tiers. In response, at operation 604, the tier-based processor instruction executor 114 causes the hardware processor to execute the received processor instruction and to send a corresponding memory instruction to the memory sub-system 110 with a memory-side memory address.

At operation 610, the tier-based data location controller 113 receives the memory instruction with a host-provided memory address from the host system 120. The processor instruction received by the hardware processor at operation 602 can include a virtual memory address (e.g., source virtual memory address), and the host-provided memory address received by the tier-based data location controller 113 at operation 610 can represent a translation of that virtual memory address (e.g., translated by the hardware processor of the host system 120). In response to receiving the memory instruction at operation 610, at operation 612, the tier-based data location controller 113 determines (e.g., identifies) a first memory location on one of the memory devices 130, 140 based on a mapping table and the host-provided memory address, where the first memory location is associated with a first memory tier. Additionally, at operation 614, the tier-based data location controller 113 determines (e.g., identifies) a second memory location on one of the memory devices 130, 140 based on a parameter included by the memory instruction, where the second memory location is associated with a second memory tier. Depending on the embodiment, the parameter used to determine can include another host-provided memory address (such as one provided in connection with the BLOCK- _SWAP processor instruction described herein) or a parameter that specifies the second memory tier (such as one provided in connection with the BLOCK_PREFETCH processor instruction or SET_TIER processor instruction described herein). Subsequently, at operation 616, the tier-based data location controller 113 copies, moves, or swaps data across the first memory location and the second memory location. To facilitate the copy/move/swap, at operation 630, one or more of the memory devices 130, 140 provide access to the first and second memory locations. As part of performing the copy, move, or swap at operation 616, the tier-based data location controller 113 can provide a status of execution (of the memory instruction) to the host system 120, which can be received by the host system 120 at operation 606. The status can indicate, for example, whether execution of the memory instruction was a success or a failure.

Figure 7:
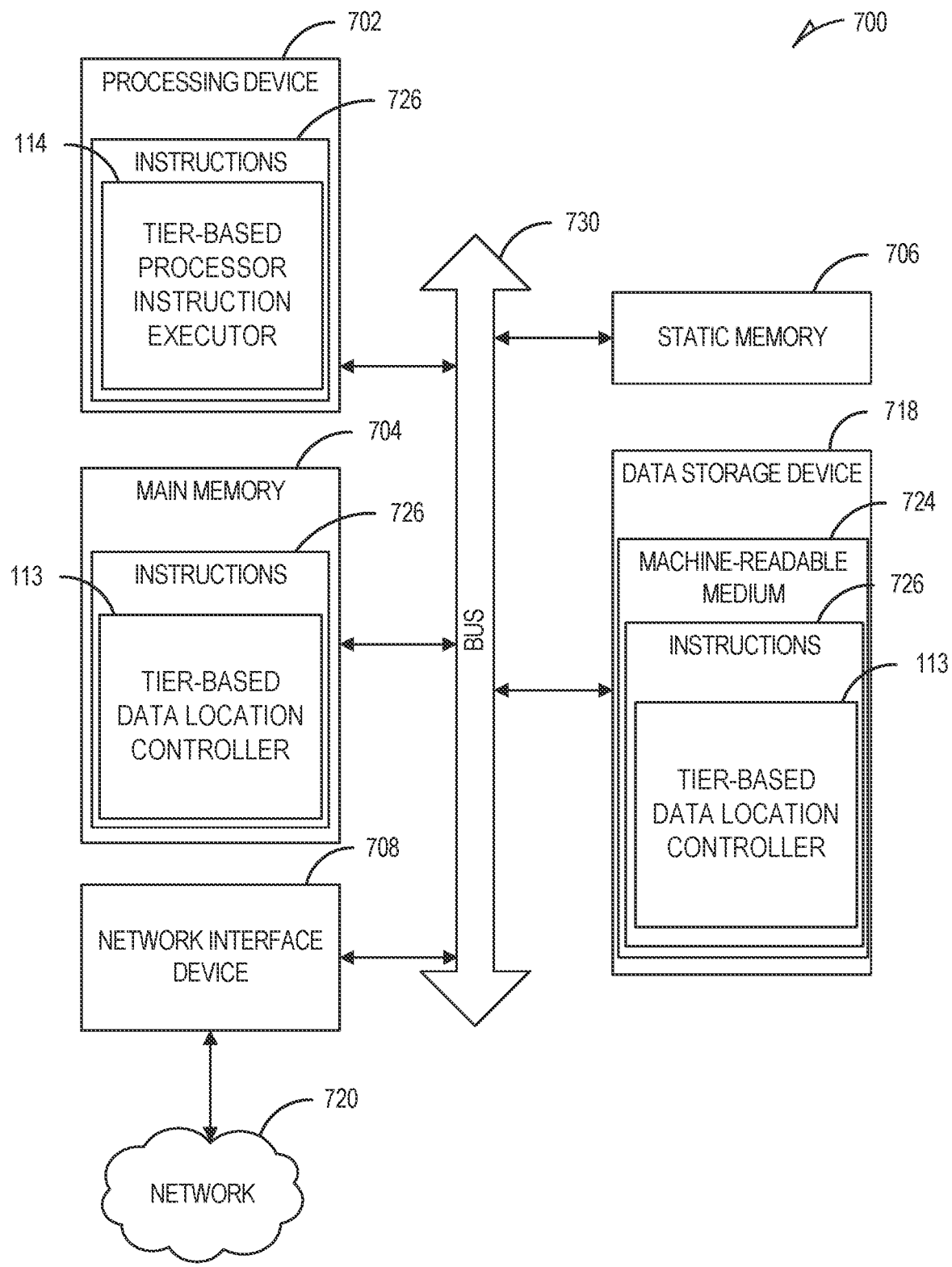
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application-specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, with the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to copying, moving, or swapping data across memory tiers as described herein (e.g., the tier-based data location controller 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks. CD-ROMs, and magnetic-optical disks, read-only memories (ROMs), random access memories (RAMs), EPROMs. EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
    a set of memory devices comprising at least a first memory device and a second memory device, memory locations on the first memory device being associated with a different memory tier than memory locations on the second memory device;
    a single memory controller operably coupled to the set of memory devices; and
    a data location controller separate from the single memory controller, the data location controller being configured to maintain a mapping table that maps host-provided memory addresses to memory locations on the set of memory devices, the data location controller being configured to perform operations comprising:
        receiving, from a host system, an instruction with a host-provided memory address for copying data across different memory tiers, the instruction comprising a parameter that specifies a target memory tier of the memory sub-system; and
        in response to receiving the instruction:
            determining, based on the mapping table and the host-provided memory address, a first memory location on the set of memory devices, the host-provided memory address comprising a host-side virtual memory address used in a page table of an operating system on the host system, the first memory location being associated with a current memory tier of the memory sub-system, the first memory location storing source data, the determining of the first memory location on the set of memory devices comprising:
                translating the host-side virtual memory address to a corresponding memory-side memory address; and
                determining the first memory location on the set of memory devices based on the mapping table and the corresponding memory-side memory address;
            determining, based on the parameter, a second memory location on the set of memory devices, the second memory location being associated with the target memory tier; and
            copying the source data from the first memory location to the second memory location.

2. The memory sub-system of claim 1, wherein the determining of the second memory location on the set of memory devices based on the parameter comprises:
    determining whether the target memory tier has sufficient storage for the source data; and
    in response to determining that the target memory tier has sufficient storage for the source data, determining the second memory location from a set of available memory locations on the set of memory devices, the set of available memory locations being associated with the target memory tier.

3. The memory sub-system of claim 2, wherein the data location controller is configured to monitor available storage on the set of memory devices according to memory tiers of the memory sub-system.

4. The memory sub-system of claim 2, wherein the data location controller is configured to monitor available memory locations on the set of memory devices.

5. The memory sub-system of claim 1, wherein the first memory location and the second memory location are on a single memory device of the set of memory devices.

6. The memory sub-system of claim 1, wherein the first memory location is on a first memory device of the set of memory devices, wherein the second memory location is on a second memory device of the set of memory devices, wherein the first memory device is associated with the current memory tier, and wherein the second memory device is associated with the target memory tier.

7. The memory sub-system of claim 1, wherein the translating of the host-side virtual memory address to the corresponding memory-side memory address comprises:
    accessing the page table of the operating system of the host system; and
    translating the host-side virtual memory address to the corresponding memory-side memory address on the memory sub-system based on information accessed from the page table.

8. The memory sub-system of claim 1, comprising:
    a memory sub-system controller operably coupled to the set of memory devices, the data location controller performing the operations without use of the memory sub-system controller.

9. The memory sub-system of claim 1, comprising:
    a memory sub-system controller operably coupled to the set of memory devices, the data location controller performing the operations by the memory sub-system controller.

10. The memory sub-system of claim 1, wherein the operations comprise:

updating, in the mapping table, a mapping of the second memory location.

11. A method comprising:
receiving, from a host system and at a data controller of a memory sub-system, an instruction with a host-provided memory address for moving data across different memory tiers, the instruction comprising a parameter that indicates a target memory tier of the memory sub-system, the data controller being separate from a single memory controller of the memory sub-system; and
in response to receiving the instruction:
determining, based on a mapping table and the host-provided memory address, a first memory location on a set of memory devices of the memory sub-system, the set of memory devices comprising at least a first memory device and a second memory device, memory locations on the first memory device being associated with a different memory tier than memory locations on the second memory device, the host-provided memory address comprising a host-side virtual memory address used in a page table of an operating system on the host system, the first memory location being associated with a current memory tier of the memory sub-system, the first memory location storing source data, the determining of the first memory location on the set of memory devices comprising:
translating the host-side virtual memory address to a corresponding memory-side memory address; and
determining the first memory location on the set of memory devices based on the mapping table and the corresponding memory-side memory address;
determining, based on the parameter, a second memory location on the set of memory devices, the second memory location being associated with the target memory tier;
moving the source data from the first memory location to the second memory location; and
updating, in the mapping table, a mapping of the second memory location.

12. The method of claim 11, wherein the parameter comprises a value representing the target memory tier.

13. The method of claim 11, wherein the host-provided memory address is a first host-provided memory address, wherein the parameter is a second host-provided memory address, and wherein the second host-provided memory address is associated with the target memory tier.

14. The method of claim 13, wherein the instruction is an instruction for swapping data across memory locations having different memory tiers, wherein the source data is first source data, wherein the mapping data maps the second host-provided memory address to the second memory location, and wherein the second memory location stores second source data, and the method comprises:
while the first source data is moved from the first memory location to the second memory location, moving second source data from the second memory location to the first memory location; and
updating, in the mapping table, a mapping of the first memory location.

15. The method of claim 11, wherein the determining of the second memory location on the set of memory devices based on the parameter comprises:
determining whether the target memory tier has sufficient storage for the source data; and
in response to determining that the target memory tier has sufficient storage for the source data, determining the second memory location from a set of available memory locations on the set of memory devices, the set of available memory locations being associated with the target memory tier.

16. The method of claim 15, comprising:
monitoring available storage on the memory sub-system according to memory tiers of the memory sub-system.

17. The method of claim 11, wherein the first memory location and the second memory location are on a single memory device of the set of memory devices.

18. The method of claim 11, wherein the first memory location is on a first memory device of the set of memory devices, wherein the second memory location is on a second memory device of the set of memory devices, wherein the first memory device is associated with the current memory tier, and wherein the second memory device is associated with the target memory tier.

19. The method of claim 11, wherein the memory sub-system comprises a memory sub-system controller and a data location controller, and wherein the method is performed by the data location controller without use of the memory sub-system controller.

20. A method comprising:
receiving, from a host system and at a data controller of a memory sub-system, an instruction with a host-provided memory address for copying data across different memory tiers, the instruction comprising a parameter that indicates a target memory tier of the memory sub-system, the data controller being separate from a single memory controller of the memory sub-system; and
in response to receiving the instruction:
determining, based on a mapping table and the host-provided memory address, a first memory location on a set of memory devices of the memory sub-system, the set of memory devices comprising at least a first memory device and a second memory device, memory locations on the first memory device being associated with a different memory tier than memory locations on the second memory device, the host-provided memory address comprising a host-side virtual memory address used in a page table of an operating system on the host system, the first memory location being associated with a current memory tier of the memory sub-system, the first memory location storing source data, the determining of the first memory location on the set of memory devices comprising:
translating the host-side virtual memory address to a corresponding memory-side memory address; and
determining the first memory location on the set of memory devices based on the mapping table and the corresponding memory-side memory address;
determining, based on the parameter, a second memory location on the set of memory devices, the second memory location being associated with the target memory tier; and
copying the source data from the first memory location to the second memory location.

* * * * *